United States Patent
Trapp

(10) Patent No.: US 12,416,055 B1
(45) Date of Patent: Sep. 16, 2025

(54) CARBON DIOXIDE EMISSION REDUCTION SYSTEM FOR ELECTRIC ARC FURNACES UTILIZING ALGAE FOR CARBON DIOXIDE ABSORBTION

(71) Applicant: CIX, INC., Oriental, NC (US)

(72) Inventor: Mark Edward Trapp, Oriental, NC (US)

(73) Assignee: CIX, INC., Oriental, NC (US)

( * ) Notice: Subject to any disclaimer, the term of this patent is extended or adjusted under 35 U.S.C. 154(b) by 0 days.

(21) Appl. No.: 19/215,462

(22) Filed: May 22, 2025

Related U.S. Application Data

(63) Continuation of application No. PCT/US2025/012268, filed on Jan. 19, 2025.

(60) Provisional application No. 63/622,844, filed on Jan. 19, 2024.

(51) Int. Cl.
| | |
|---|---|
| *C21B 3/06* | (2006.01) |
| *F27B 3/08* | (2006.01) |
| *F27B 3/28* | (2006.01) |
| *F27D 17/30* | (2025.01) |

(52) U.S. Cl.
CPC .............. *C21B 3/06* (2013.01); *F27B 3/085* (2013.01); *F27B 3/28* (2013.01); *F27D 17/304* (2025.01); *C21B 2400/02* (2018.08)

(58) Field of Classification Search
CPC ....... C21B 3/06; C21B 2400/02; F27B 3/085; F27B 3/28; F27D 17/304
USPC ........................................................ 266/201
See application file for complete search history.

(56) References Cited

U.S. PATENT DOCUMENTS

| | | | |
|---|---|---|---|
| 6,030,430 A | 2/2000 | Claflin et al. | |
| 7,914,599 B2 * | 3/2011 | Stein | ......... C21C 5/54 |
| | | | 419/65 |
| 2015/0143806 A1 | 5/2015 | Friesth | |
| 2016/0045841 A1 | 2/2016 | Kaplan et al. | |
| 2023/0364553 A1 | 11/2023 | Luo et al. | |
| 2024/0254576 A1* | 8/2024 | Tsvik | ......... C21B 13/0086 |

FOREIGN PATENT DOCUMENTS

| | | | | |
|---|---|---|---|---|
| CA | 3223484 | * | 1/2023 | ....... C21C 7/0025 |
| WO | 2014005227 A1 | | 1/2014 | |
| WO | 2023111779 A1 | | 6/2023 | |

OTHER PUBLICATIONS

USPTO, International Search Report and Written Opinion for PCT/US2025/012268, Mailed on Mar. 27, 2025.

* cited by examiner

*Primary Examiner* — Jessee R Roe
*Assistant Examiner* — Michael Aboagye
(74) *Attorney, Agent, or Firm* — Invention To Patent Services; Alex Hobson

(57) ABSTRACT

A slag foaming system for an electric arc furnace utilizing algae is described. The algae may be dried algae in particle form that is injected into the electric arc furnace through a solids injector and may be directed into the slag. Other slag foaming compositions may also be injected into a furnace as a function of furnace parameters to create slag foam while maintaining a high yield of slag without excess iron oxide and reduced carbon and carbon dioxide emission. The algae and slag foaming composition may be used in combination for slag formation and control.

20 Claims, 5 Drawing Sheets

CARBON DIOXIDE EMISSION REDUCTION SYSTEM FOR ELECTRIC ARC FURNACES UTILIZING ALGAE FOR CARBON DIOXIDE ABSORBTION

CROSS REFERENCE TO RELATED APPLICATIONS

This application is a continuation of International patent application No. PCT/US2025/012268, filed on Jan. 19, 2025, which claims the benefit of priority to U.S. provisional patent application No. 63/622,844, filed on Jan. 19, 2024; the entirety of all prior priority applications are hereby incorporated by reference herein.

BACKGROUND OF THE INVENTION

Field of the Invention

The invention relates to a system for the reduction of carbon dioxide ($CO_2$) intensity ($kgCO_2$ eq/tonne) from an electric arc furnace utilizing algae for steel production.

Background

Electric arc furnaces for years have relied on slag foaming to get better arc efficiency. Since the 1990's, electric arc furnaces have employed a technique called slag foaming to cover the exposed arc improving safety, electrical efficiency and lowering the consumption of the graphite electrodes. Foaming is achieved, traditionally, by injecting oxygen into the furnace, which lowers the bath carbon content and creates FeO (iron oxide) in the slag. Carbon particles are injected pneumatically into the slag. The carbon reacts with the FeO and makes carbon monoxide (CO), gas bubbles that foam the slag. This foam drastically increases the depth of the slag by reducing its density and provides increased insulation to the bath. The foamed slag floats on the bath and insulates the arc by reducing radiant energy losses.

The nonferrous oxides (slag) floats on the surface of the molten steel bath. Operators inject supersonic oxygen in the bath to remove carbon and in the process, make FeO. This FeO is not very stable compared to CO. So, the FeO reacts with carbon that is injected, reduces FeO back to Fe and makes CO gas which bubbles and makes the slag foamy, containing gas bubbles. Therefore, some plants inject anthracite, such as 1-2 mm anthracite particles to make CO bubbles. The CO is evacuated into the off-gas system, where it is at a very high temperature and in the presence of oxygen from the air combusts to make carbon dioxide $CO_2$. This "post combusts" CO to $CO_2$ is often emitted into the atmosphere and is a greenhouse gas which may have a detrimental impact on climate change if the method of $CO_2$ production is from non-sustainable sources such as coal, coke or petroleum coke. The steel industry around the world is spending billions towards $CO_2$ reduction strategies.

SUMMARY OF THE INVENTION

The invention is directed to a system for the reduction of carbon dioxide from an electric arc furnace utilizing algae. Algae, such as dried algae, is injected into the slag to react with iron oxide in the slag, creating carbon monoxide bubbles as a result. Algae is a renewable resource that can be farmed and absorbs carbon monoxide much more effectively than other organic materials, orders of magnitude better than wood ash, for example. The algae may be used to replace carbon injection or a portion of the carbon injection for slag foaming and absorb much more carbon monoxide and reduces carbon dioxide emissions from the system. Also, algae injection versus carbon injection produces much lower ash ($SiO_2$, $Al_2O_3$), which lowers flux (lime) usage and improves yield of the electric arc furnace process. Use of an algae injection system may enable a net-zero greenhouse gas emission. Currently the emissions for electric arc furnace is about 700 kg to 1400 kg $CO_2$/tonne of steel produced, depending on the final product requirements; a significant contributor to greenhouse gas.

Carbon dioxide intensity is a measure that has been adopted to quantity the carbon dioxide footprint of steel production. All greenhouse gases are given an equivalent $CO_2$ equivalency and are assigned on a per tonne of steel produced basis. The $CO_2$ footprint counts the upstream $CO_2$ generation of the steelmaking process, the electrical energy required to produce the steel and the actual emissions equivalents are grouped in three categories:

SCOPE 1: Direct emissions from the steelmaking process;
SCOPE 2: Electrical energy required is given a $kgCO_2$/MWh value based on the local electrical grid's mix of generation methods; and
SCOPE 3: Upstream $CO_2$ equivalents are rolled up, including transportation of materials into this category and make up a larger portion of steel's $CO_2$ footprint.

The algae may be dried and formed into particles for injection into the furnace. The algae may have a very low water content after drying, such as about 5 wt % or less, about 2.5 wt % or less, about 1 wt % or less, about 0.5 wt % or less and any range between and including the values provided. The small particle size may enable higher reaction rates. The average particle size of the dried algae may be about 10 mm or less, about 5 mm or less, about 1 mm or less, about 500 μm or less, about 100 μm or less and any range between and including the particle sizes provided. The particle size may be determined through the use of a particle size analyzer, such as an LS13 320 XR Particle Size Analyzer from Beckman Coulter, Brea CA.

Carbon content of algae is 56% of the fixed carbon value in anthracite, so more mass would be required but the carbon dioxide absorption would be improved. Also, the density of dried algae is lower than anthracite, therefore the momentum for slag penetration would be less for the same velocity of injection. Currently, anthracite particles with an average size of 5 mm is preferred, and for dried algae a smaller particle would be preferred or the algae may be formed into a pellet and may include a binder to maintain the pellet size and shape. An algae pellet may have an average particle size of about 1 mm or less and may have a particular geometry such as spherical or oval in shape to aid in flow through the injector and penetration into the slag. An algae pellet may include one or more of a conventional carbon injectable material such as but not limited to anthracite, pet coke, and coke breeze. A binder may be a glue that also is a carbon source and may be an organic glue or binder formed of organic materials.

The algae may be grown in an algae farm wherein the algae utilizes and absorbs carbon dioxide. In an exemplary embodiment, an algae farm receives carbon dioxide produced by an electric arc furnace. A slag foaming system for an electric arc furnace may directly deliver carbon dioxide from the electric arc furnace system to an algae farm. A conduit may extend from the electric arc furnace and may provide carbon dioxide to the algae tanks, wherein the carbon dioxide is consumed, thereby reducing greenhouse emissions from the electric arc furnace.

The algae may be used in combination with more traditional injectable carbons such as anthracite, pet coke, coke breeze, and the like. The combination of injectable carbon based materials may be used to form and control the slag in an electric arc furnace.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
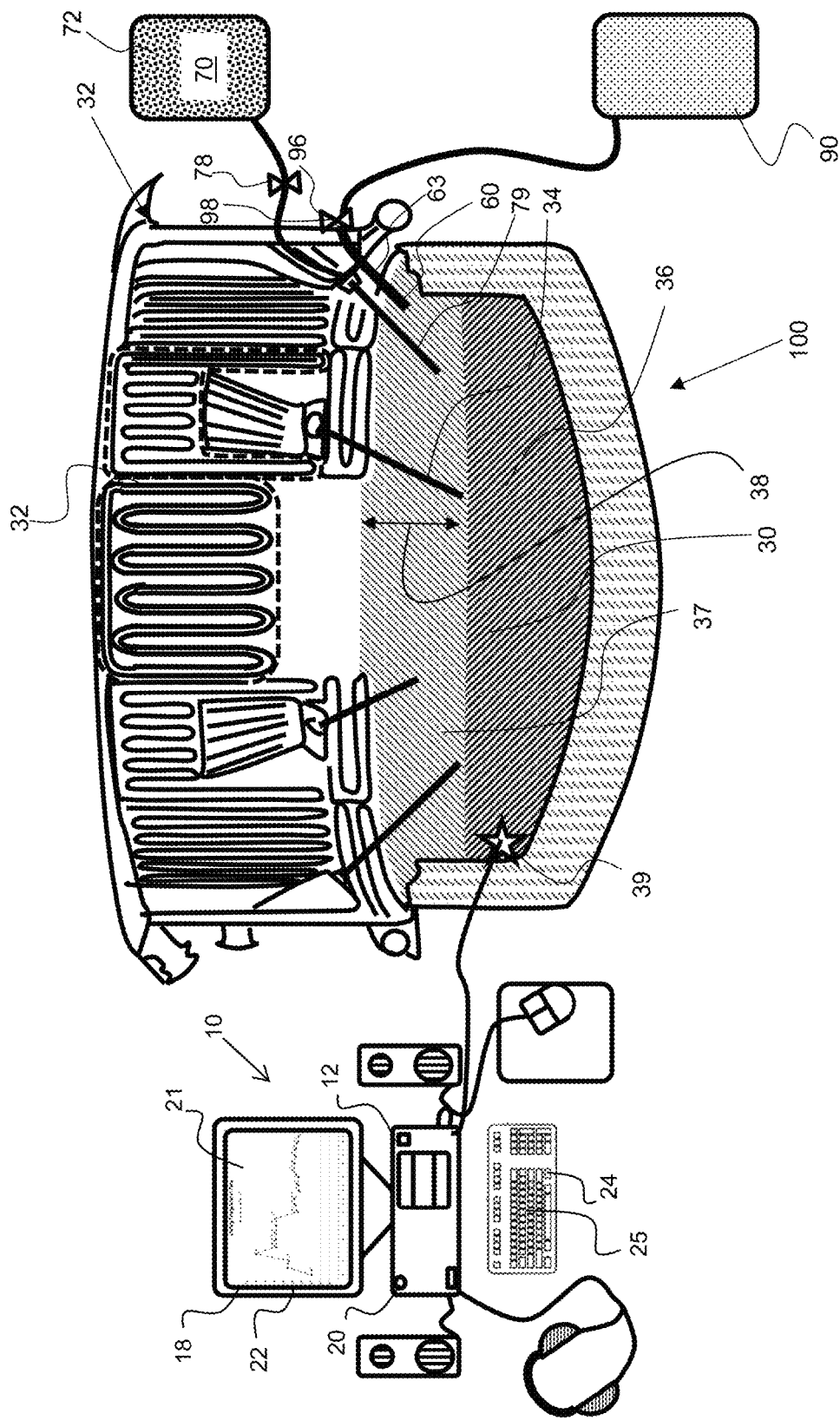
FIG. 1 shows an exemplary slag foaming system employing algae as a slag foaming compositions, an input terminal and a computing device to determine the amount of algae for injection.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1 an electric arc furnace, 32 comprises a slag foaming system 100 comprising an iron slag foaming composition 90. The slag foaming composition is configured to be injected through a carbon injector 60 into the electric arc furnace 32 to create the slag foam 37, having a thickness 38, over top of the slag 36 within the furnace 30. The electric arcs 34 will be insulted by the foam as described herein.

An algae receptacle 72 is configured to retain algae 70, such as dried algae in particle form, as described herein, for injection into the slag for reaction with iron oxide to form carbon monoxide gas bubbles. The concentration of the algae to the slag foaming compositions described may be determined for optimum slag formation with reduced carbon dioxide emissions from the electric arc furnace 32. The algae may be delivered to the arc furnace through an algae solids injector 79 and this may be separate from the solids injector 63 used for the slag foaming compositions. An algae valve 78 may control the flow rate of delivery of algae to the furnace 30 or to the carbon injector 60. The algae 70 may be added in a control ratio with a slag foaming composition 90.

A slag foaming system 100 includes a slag foaming control system 10 comprises a computer 20, a computing device that can receive furnace parameters automatically through one or more furnace sensors 39, or through input by the user interface 24 to compute the amount and ratios of the algae 70 and/or iron slag foaming compositions 90 to inject. The slag foaming system takes these inputs and determines how much of each of the slag foaming composition to inject through the solids injector of carbon injector 60 and algae solids injector 79. A manifold 96 comprising one or more valves 98 may be used to control the ratios of the slag composition injected. A computer implemented control program 12 may be used to control the type and amount of the slag foaming compositions and algae 70 to inject into the furnace and may utilize input from the one or more furnace sensors 39 to determine what and how much of a slag foaming composition to inject. The computer 20 interface has a display screen 21, with a display 18 thereon, and a user interface 24, such as a keyboard 25 and mouse.

Figure 2:
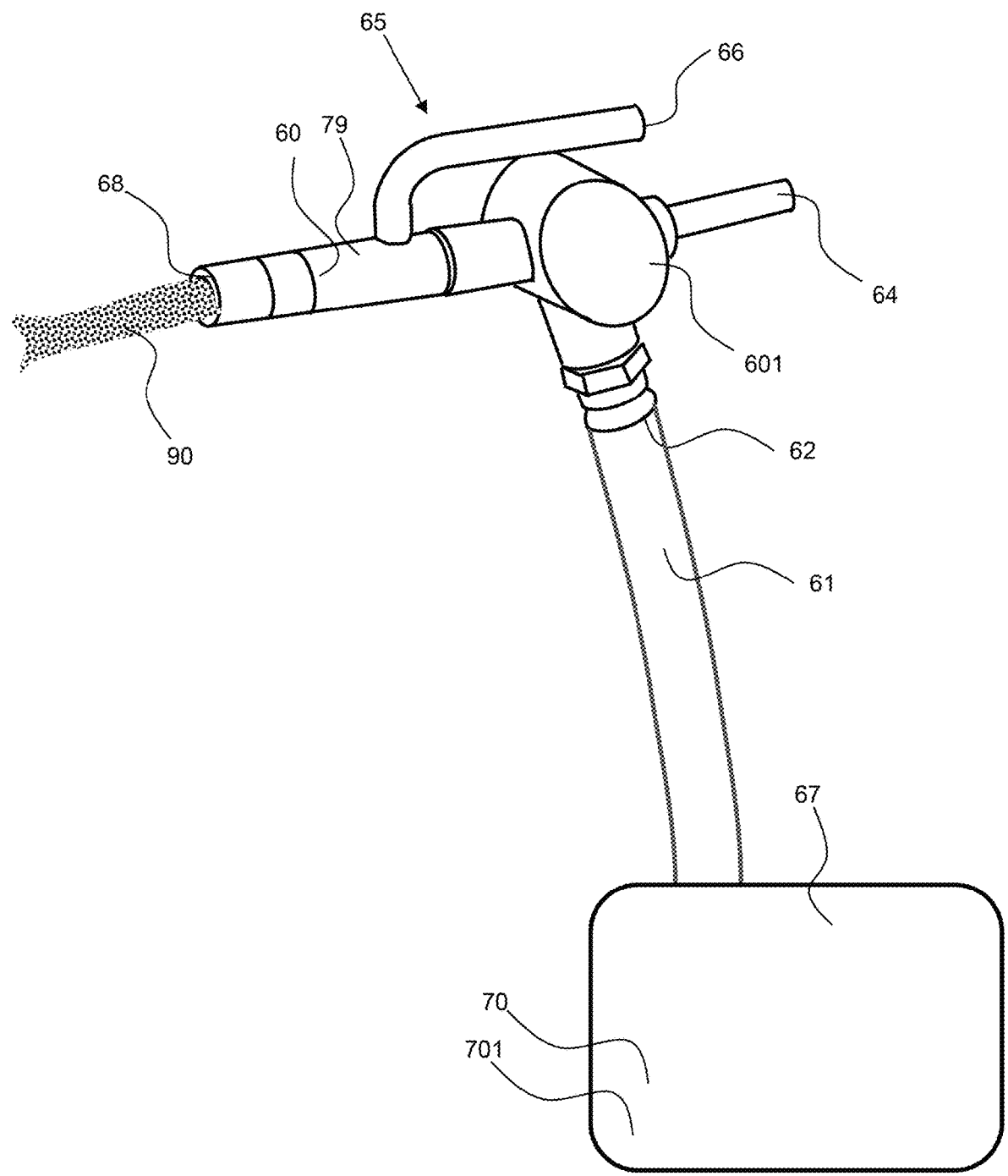
FIG. 2 shows a perspective view of an exemplary injector for injecting algae into an electric arc furnace to produce slag and slag foam.

As shown in FIG. 2, a slag foaming delivery system 65 includes an injector for a slag foaming composition 90, such as a carbon injector 60 for injecting a carbon source including algae 70 into an electric arc furnace. The injector may be an algae solids injector 79 and may have a solids input 62 for receiving the algae from an algae retainer 67, an through an algae conduit 61. Also, the algae solids injector 79 may have a power connection 64 for powering the pump 601 and a compressed gas input 66, wherein the algae particles and compressed gas are injected at a very high velocity into the arc furnace from the injector outlet 68. The solids input 62 is coupled with an algae receptacle 72 that contains algae particles 701, which may be pellets of algae as described herein.

Figure 3:
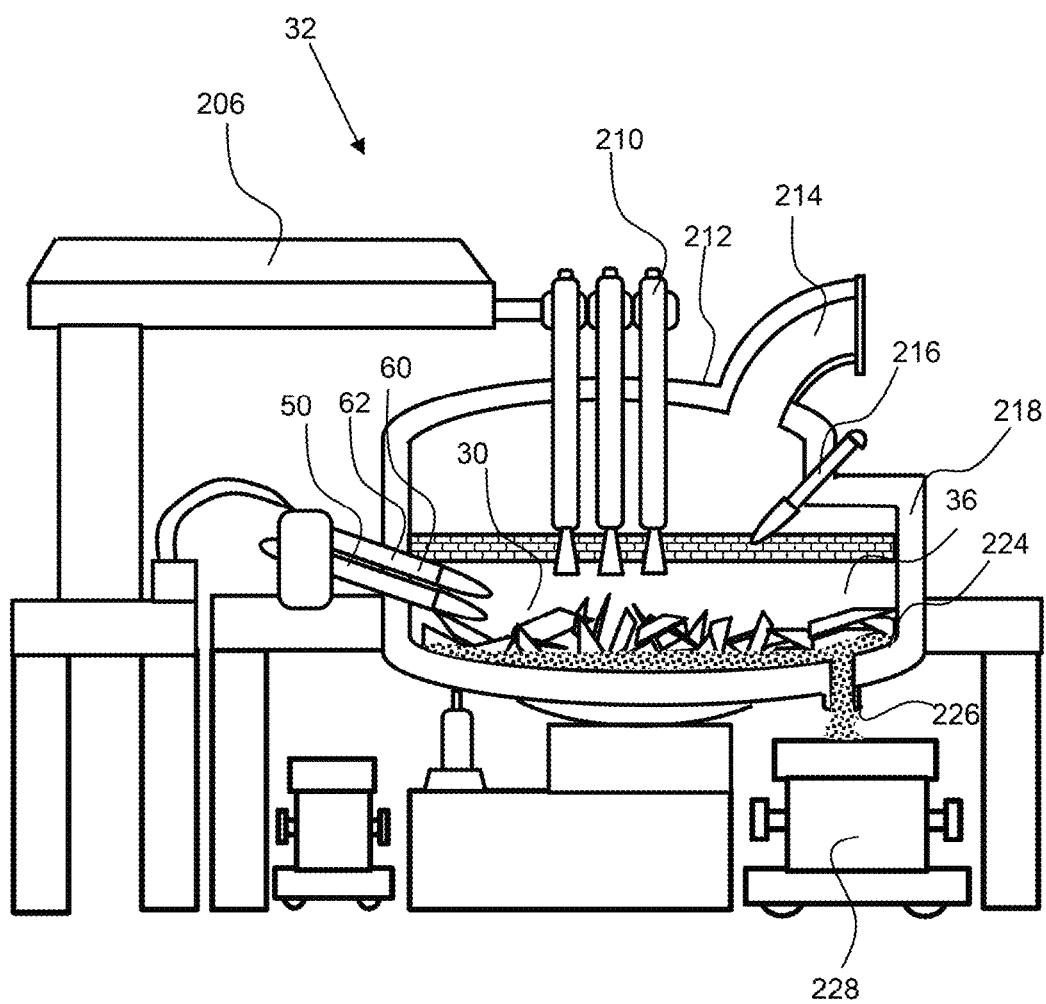
FIG. 3 shows a cross sectional diagram of an electric arc furnace.

FIG. 3 shows an exemplary electric arc furnace 32 as depicted on Wiley Online Dictionary. The electric arc furnace 32 includes carbon injector 60 and oxygen injector 50, and electrode arm 206 that provides power to the electrodes 210, such as graphite electrodes. The furnace shell 218 may be cooled, such as by water cooled and the furnace shell forms an enclosure for the slag 36 and has a roof 212, and oxyfuel burner 216. The melted slag 224 flows through the tap 226 into a ladle 228.

Figure 4:
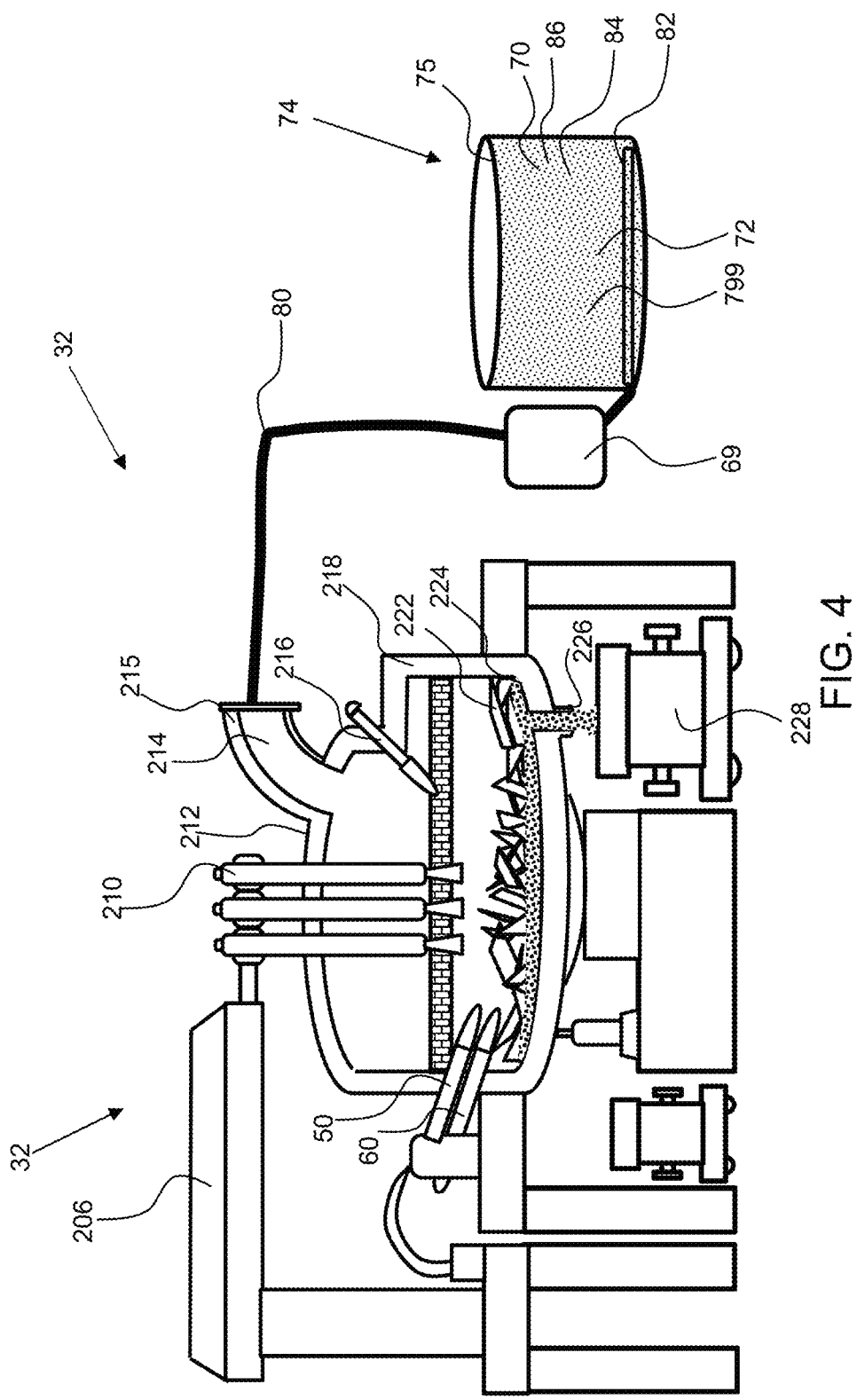
FIG. 4 shows a diagram of a slag foaming system for an electric arc furnace having a conduit to supply carbon dioxide produced by the electric arc furnace to an algae farm.

FIG. 4 shows the electric arc furnace 32 shown in FIG. 3, coupled with an algae farm 74, wherein carbon dioxide from the electric arc furnace 32 is delivered to the algae farm through a carbon dioxide conduit 80. The carbon dioxide may be drawn from the furnace shell and from an off-gas port 215, such as the off-gas elbow 214. The carbon dioxide may be bubbled into an algae tank 75, wherein the algae 70 consumes the carbon dioxide. A carbon dioxide conduit 80 may extend from the electric arc furnace to the algae farm 74 and the carbon dioxide may be bubbled through a bubbler 82 into an algae tank 75, to produce carbon dioxide bubbles 84 having a high surface area with the algae solution 799 to improve consumption of the carbon dioxide, wherein the carbon dioxide 86 is consumed by the algae 70. The bubbles may be small to enhance consumption and to increase the rate of algae growth and may have a diameter of about 5 mm or less, about 3 mm or less, about 2 mm or less, about 1 mm or less, about 0.5 mm or less or even 0.25 mm or less and any range between and including the carbon dioxide bubble diameters provided. Any suitable algae receptacle 72 may be used, such as a large tank. Also, a heat transfer unit 69 may be used to cool the carbon dioxide before introducing the carbon dioxide into the algae receptacle 72, a retainer such as an 85 algae tank 75.

Figure 5:
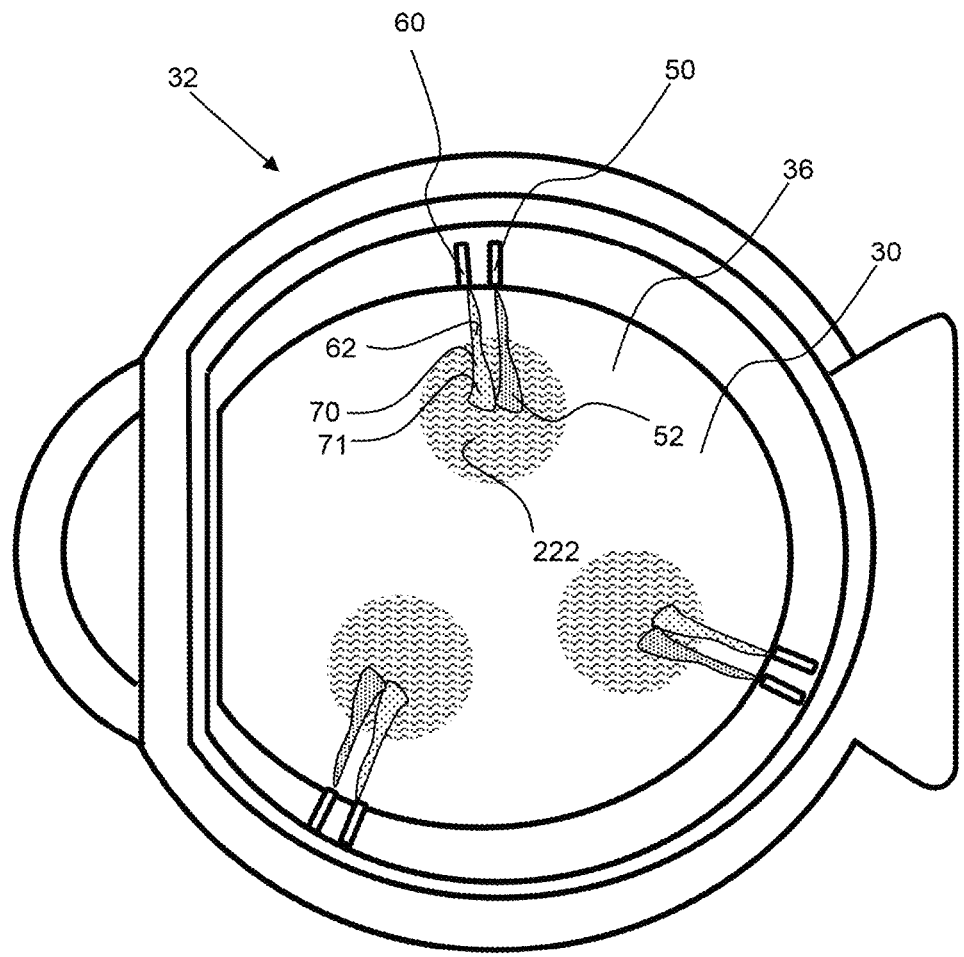
FIG. 5 shows a top view of an electric arc furnace having injectors for oxygen and carbon injection, wherein the carbon may be particle of algae.

FIG. 5 shows a top view of an electric arc furnace 32 having oxygen injectors 50, and carbon injectors 60, that is a solids input 62 for receiving a carbon source, such as algae 70. The oxygen 52 and algae 70 such as algae pellets 71 are injected into the slag to form a slag foam, slag with gas bubbles retained therein to reduce the density of the slag.

Figure 6:
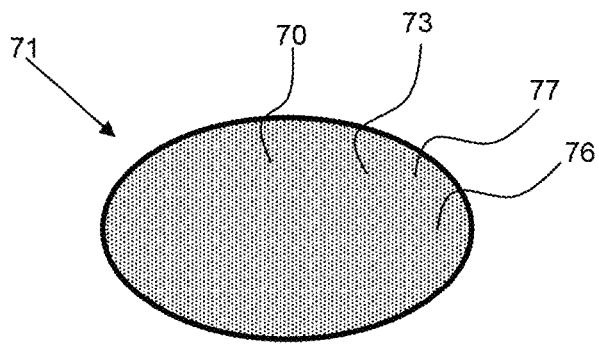
FIG. 6 shows a cross-sectional view of an algae pellet containing dried algae, a binder and a secondary carbon material.

As shown in FIG. 6, an algae pellet 71 contains algae 70, such as dried algae 73 as defined herein, and may contain a binder 76 and a secondary carbon material 77, such as anthracite, pet coke, and coke breeze. The algae pellet may be round or spherical in shape or may have an oval cross-sectional shape as shown. The outer surface may be cured for better penetration into the slag. The average particle size of the dried algae in the pellet and/or the average particle size of the pellet may be about 10 mm or less, about 5 mm or less, about 1 mm or less, about 500 μm or less, about 100 μm or less and any range between and including the particle sizes provided.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A slag foaming system for an electric arc furnace utilizing a renewable source of carbon comprising:
 a) an electric arc furnace;
 b) a slag foaming delivery system comprising:
  i) a slag foaming composition comprising algae wherein the algae includes algae particles;
  ii) an algae receptacle for said algae; and
  iii) an algae injector for injection of the algae from the algae receptacle into said electric arc furnace,
 wherein the algae provides said renewable source of carbon for production of a carbon dioxide from the electric arc furnace.

2. The slag foaming system of claim 1, wherein the slag foaming delivery system further comprises an algae farm.

3. The slag foaming system of claim 2, wherein the carbon dioxide from the electric arc furnace is delivered to the algae farm and wherein the carbon dioxide is consumed by the algae.

4. The slag foaming system of claim 3, wherein the slag foaming delivery system further comprises a carbon dioxide conduit that delivers carbon dioxide from the electric arc furnace to the algae farm.

5. The slag foaming system of claim 3, wherein the algae in the slag foaming composition is delivered from the algae farm.

6. The slag foaming system of claim 1, wherein the algae is a dried algae having a water content of 5 wt % of less.

7. The slag foaming control system for a furnace of claim 1, wherein the slag foaming composition comprises a moisture content of no more than 2% by weight.

8. The slag foaming system of claim 1, wherein the algae particles have an average particle size of 5 mm or less.

9. The slag foaming system of claim 1, wherein the algae is configured in a pellet form.

10. The slag foaming system of claim 9, wherein the algae pellet comprises dried algae having a water content of less than 5 wt % and a binder.

11. The slag foaming system of claim 10, wherein the binder is an organic binder and provides an additional carbon source to the electric arc furnace.

12. The slag foaming system of claim 10, wherein the algae pellet comprises a secondary carbon material.

13. The slag foaming system of claim 12, wherein the secondary carbon material is selected from the group consisting of: anthracite, pet coke and coke breeze.

14. The slag foaming system of claim 9, wherein the algae pellet comprises a secondary carbon material selected from the group consisting of: anthracite, pet coke and coke breeze.

15. The slag foaming system of claim 1, wherein the carbon dioxide from the electric arc furnace is delivered to the algae farm and wherein the carbon dioxide is consumed by the algae.

16. The slag foaming system of claim 1, wherein the slag foaming composition further comprises an iron slag foaming compositions.

17. The slag foaming control system for a furnace of claim 16, further comprising an iron solids injector for injection of one or more of the iron slag foaming compositions into the furnace.

18. The slag foaming system of claim 16, wherein the iron slag foaming compositions comprises a moisture content of no more than 10% by weight.

19. The slag foaming system of claim 1, wherein the algae solids injector comprises:
 a) a compressed gas input for receiving compressed gas;
 b) a solids input for receiving algae therein; and
 c) an algae conduit coupled to the solids input to deliver said algae to the solids input.

20. The slag foaming system of claim 1, further comprising a slag foaming control system comprising:
 a) said electric arc furnace having slag under a slag foam layer;

wherein the slag foam layer has a thickness; and
b) a computer implemented control program that computes the amount and type of slag foaming composition to be injected into the electric arc furnace.

* * * * *